(12) United States Patent
Stol et al.

(10) Patent No.: US 7,401,723 B2
(45) Date of Patent: Jul. 22, 2008

(54) ADVANCED FRICTION STIR WELDING TOOLS

(75) Inventors: Israel Stol, Pittsburgh, PA (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 494 days.

(21) Appl. No.: 11/100,878

(22) Filed: Apr. 7, 2005

(65) Prior Publication Data

US 2006/0043151 A1    Mar. 2, 2006

Related U.S. Application Data

(60) Provisional application No. 60/605,960, filed on Aug. 30, 2004.

(51) Int. Cl.
B23K 20/12 (2006.01)
B23K 37/00 (2006.01)
B23K 31/02 (2006.01)

(52) U.S. Cl. .................... 228/2.1; 228/112.1

(58) Field of Classification Search ........... 228/2.1, 228/112.1, 2.3
See application file for complete search history.

(56) References Cited

U.S. PATENT DOCUMENTS

| | | | |
|---|---|---|---|
| 3,643,969 A * | 2/1972 | Finley et al. | 279/4.08 |
| 4,356,574 A | 11/1982 | Johnson | |
| 5,460,317 A | 10/1995 | Thomas et al. | 228/112.1 |
| 6,029,879 A | 2/2000 | Cocks | |
| 6,273,323 B1 | 8/2001 | Ezumi et al. | |
| 6,516,992 B1 | 2/2003 | Colligan | |
| 6,648,206 B2 | 11/2003 | Nelson et al. | |
| 6,676,004 B1 | 1/2004 | Trapp et al. | |
| 6,706,130 B1 | 3/2004 | Minamitani et al. | |
| 6,758,382 B1 | 7/2004 | Carter | |
| 6,779,704 B2 | 8/2004 | Nelson et al. | |
| 6,908,690 B2 | 6/2005 | Waldron et al. | |
| 7,275,675 B1 | 10/2007 | Carter et al. | |
| 2003/0029903 A1* | 2/2003 | Kashiki et al. | 228/112.1 |
| 2003/0209588 A1 | 11/2003 | Colligan | |
| 2005/0139640 A1 | 6/2005 | Kay | |
| 2005/0252947 A1 | 11/2005 | Fujii et al. | |
| 2006/0043152 A1 | 3/2006 | Stol et al. | |
| 2006/0049232 A1 | 3/2006 | Murakami | |

FOREIGN PATENT DOCUMENTS

JP    2000362959    6/2002

OTHER PUBLICATIONS

Office Action mailed from the U.S. Patent and Trademark Office on Jun. 13, 2006 as Paper No. 20060608, relating to U.S. Appl. No. 11/235,584, consisting of ten (10) pages.
Office Action mailed from the U.S. Patent and Trademark Office on Nov. 21, 2006 as Paper No. 20061117, relating to U.S. Appl. No. 11/235,584, consisting of ten (10) pages.
Office Action mailed from the U.S. Patent and Trademark Office on Oct. 31, 2007 as Paper No. 20071026, relating to U.S. Appl. No. 11/133,083, consisting of seventeen (17) pages.

* cited by examiner

*Primary Examiner*—Jerry A. Lorengo
*Assistant Examiner*—Megha Mehta
(74) *Attorney, Agent, or Firm*—Greenberg Traurig LLP; Peter J. Borghetti

(57) ABSTRACT

A friction stir welding tool includes an integral shank-pin unit and a shoulder attached to the shank-pin unit.

22 Claims, 16 Drawing Sheets

ADVANCED FRICTION STIR WELDING TOOLS

CROSS REFERENCE TO RELATED APPLICATION

The present invention claims priority from the provisional patent application entitled "Advanced Friction Stir Welding Tools", Application No. 60/605,960, filed on Aug. 30, 2004.

FIELD OF THE INVENTION

The present invention relates to friction stir welding and, more particularly, it relates to improved tools for friction stir welding.

BACKGROUND OF THE INVENTION

The Friction Stir Welding (FSW) process is a solid-state based joining process, which makes it possible to weld a wide variety of materials (Aluminum, Copper, Stainless Steels, etc.) to themselves and to weld various combinations (e.g. aluminum alloys 6xxx/5xxx, 2xxx/7xxx, etc.) to each other. The process is based on "plunging" a rotating FSW tool into the joining area. The rotating friction stir welding tool heats the workpiece(s) by friction, so the material becomes plasticized and flows around the axis of the tool due to shear caused by the tool.

FIG. 1 shows a prior art friction stir welding tool 10. The tool 10 includes a pin 12 which, preferably, is threaded. The shank 18 is for gripping in a chuck or collet of the friction stir welding machine. The tool 10 also includes shoulder 14, having workpiece engaging surface 16, which is for preventing material from flowing upwardly, out of the joint being formed. The tool is rotated in the direction such that the threads 13 on pin 12 push plasticized material downwardly into the joint. A setup for friction stir welding is shown in FIG. 2.

The setup includes a rotating chuck or collet 11 which grips shank 18 of tool 10. The setup also includes a moveable carriage (bed) 19 to which the workpiece(s) 111 is/are clamped. An anvil 115 underlies workpieces 111. The carriage 19 is translated relatively to the chuck or collet 11, so the pin 12 progresses along the joint 114 which is to be welded. Conversely, the relative motion of the FSW tool holding chuck or collet can also be achieved by keeping the carriage 19 and workpiece(s) 111 stationary and moving (or translating) the welding head relative to them.

FIGS. 3-7 illustrate the process of beginning a friction stir welding process. Rotary motion is imparted to tool 10 having pin 12 as shown in FIG. 3. Then, while tool 10 is rotating, it is brought down to the workpieces(s) 111 as shown in FIG. 4. The tool 10 is then pressed downwardly so the pin 12 contacts the workpieces, preferably at joint 114 and begins heating them locally by friction, and the heat plasticizes the workpiece material. The tool is then further pressed downwardly into the workpieces, as shown sequentially in FIGS. 5, 6, and 7.

The heat due to the friction causes plasticized material 112 of the workpiece(s) 111 to soften and flow around the axis of the pin 12. In FIG. 7, the pin 12 is plunged almost entirely into the workpiece(s) 111. Typically, an anvil 115 lies below the workpiece(s) 111 to counteract the downward "plunging" (or Fz) force imparted by the tool holding chuck onto the joint area and maintain a smooth surface on the underside of the workpiece(s) 111.

Once the pin 12 has been plunged into the workpiece(s) 111, the bed 19 is translated, so the pin 12 is moved relative to the workpiece(s) 111 along the joint to be welded. As the plasticized material cools behind the pin 12, it coalesces into sound metallurgical bonds.

FIG. 8 illustrates in greater detail the principal aspects of a prior art FSW tool 10. Tool 10 includes a shank 18, a pin 12 and a shoulder 14. Shank 18 may have a flat 21. Shoulder 14 has a workpiece engaging surface 16. Pin 12 has threads 13 and flats 15. When tool 10 is in use, it is rotated in the direction that will cause plasticized material engaged by threads 13 on pin 12 to move downwardly, into the workpiece(s) 111. The flats 15 serve to reduce the torque needed to rotate the pin 12. The workpiece engaging surface 16 of the shoulder 14 has a spiral thread (or scroll) 17 which tends to cause plasticized material to flow inward radially, toward the base of pin 12, when the tool is rotated in the direction which is appropriate for threads 13 on pin 12.

FIG. 9 illustrates an integral (or monolithic) FSW tool 20. The pin 22, shank 28 and shoulder 24 are integrally formed. Good concentricity is obtained between the shank 28 and the pin 22. The disadvantage of this design is that it may be desirable to make the pin 22 of a material having preferred properties, which may not be needed for the shoulder 24, but which is very expensive. For an integrally formed tool, much of that material would be wasted on the shoulder 24. Also, the material may be available only in small diameter form, insufficient to form the shoulder 24.

One prior art solution to this problem is to make the pin out of a material (e.g. MP159) that is different from the material out of which the shoulder and shank are made (e.g. H13). The traditional way of designing such a composite FSW tool is to "consolidate" the tool's shoulder with the shank into one piece, and then insert the pin into it.

FIGS. 10 and 11 illustrate a prior art tool 30 having a shoulder 34 which is integral with the shank 38. The tool has a pin 32 which is held by one or two setscrews 39. There may be some clearance 33 between the pin 32 and the shoulder 34. It is very difficult to obtain good alignment between the pin 32 and the shoulder 34/shank 38 with this design. Hence, pin 32 tends to be eccentric and to wobble as it turns during friction stir welding of the workpiece(s). This introduces cyclic loads on pin 32 that may cause it to break. This is especially true when joining strong, hard materials (e.g. 7055, Stainless Steel, Titanium) and/or relatively thick parts (e.g. 45 mm).

These eccentricities, which lead to more pronounced vibrations and cyclic loading of the pin 32 during welding, often shorten the life of the pin 32. This is typically manifested by breakage of pin 32 near its base, near the shoulder 34 of the tool 30. These eccentricities are caused by:

(a) The intentional clearance 33 designed between the pin 32 and the hole in the shoulder 34 to accept it (FIG. 11).
(b) Uneven and unrepeatable tightening of the set-screws 39, which varies the clearance between the pin and the hole that accepts it in the shoulder.
(c) Normal compounding of machining tolerances of the pin and shoulder/shank.
(d) Variations in placement of the shank within the FSW machine's chuck or collet.

Accordingly, there is a need for FSW tools which reduce shank-pin misalignment and hence are more resistant to breakage.

SUMMARY OF THE INVENTION

In one aspect, the present invention teaches an FSW tool wherein the pin and shank are integrally (monolithically) formed so as to be precisely concentric. A shoulder is attached to the shank-pin unit.

In another aspect, the present invention teaches an FSW tool having an axial tension member to reduce the damaging effects of cyclic bending moment loading on the pin as it is moved along a joint being welded. This type of loading gets compounded by simultaneously inducing bending-shear, bending-tensile and torsional-shear stresses at various portions of the pin.

In an additional aspect, the present invention teaches an FSW tool having cooling ducts for a coolant fluid to lower its temperature.

DETAILED DESCRIPTION OF PREFERRED AND ALTERNATIVE EMBODIMENTS OF THE INVENTION

In the discussion which follows, directional terms such as "upper", "lower", "top", "bottom", etc. apply relative to welding setups oriented with the pin of the FSW tool at the bottom and the shank at the top. The terms "distal" and "proximal" are also used. Distal has the meaning of farthest from the shank of the FSW tool, proximal means nearer.

The present invention eliminates eccentricities between the pin and shank of an FSW tool which would otherwise cause the pin to vibrate and have a reduced life. The concept also reduces or eliminates eccentricities between the pins and shoulders of composite type FSW tools In order to eliminate the eccentricities and their adverse effect on tool life during FS welding with traditional composite tools, this invention teaches the concept of making the pin and shank out of one monolithic piece. The shoulder is threaded onto the shank-pin unit 50.

Figure 1:
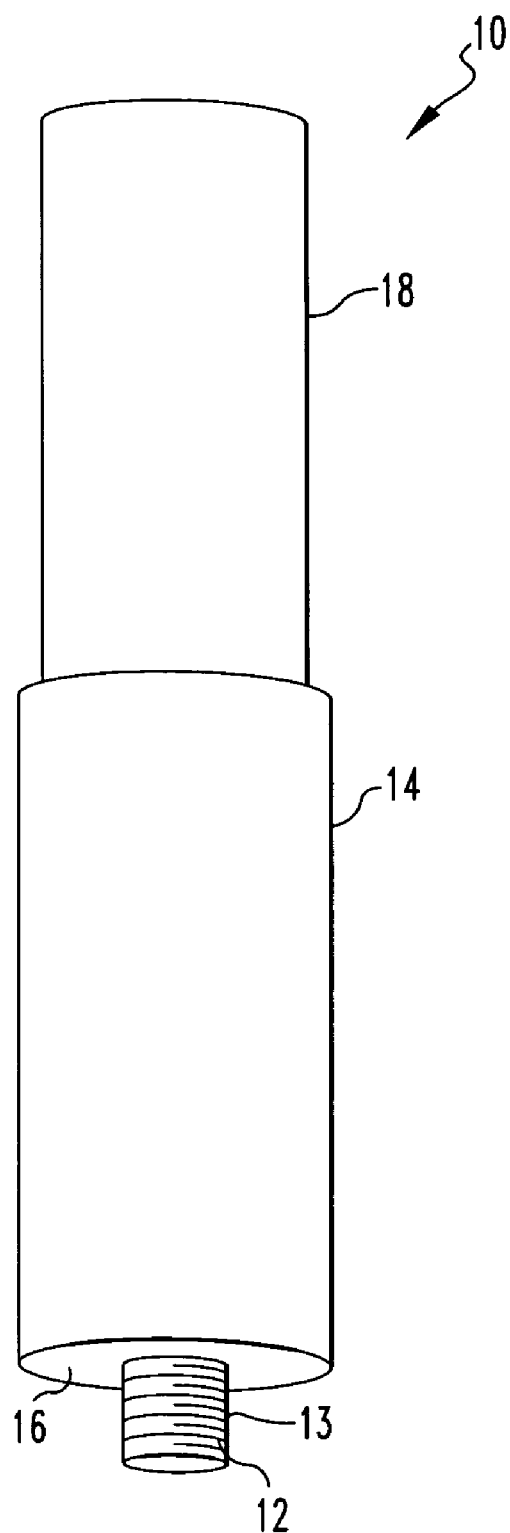
FIG. 1 is a sketch of an FSW tool.
Figure 2:
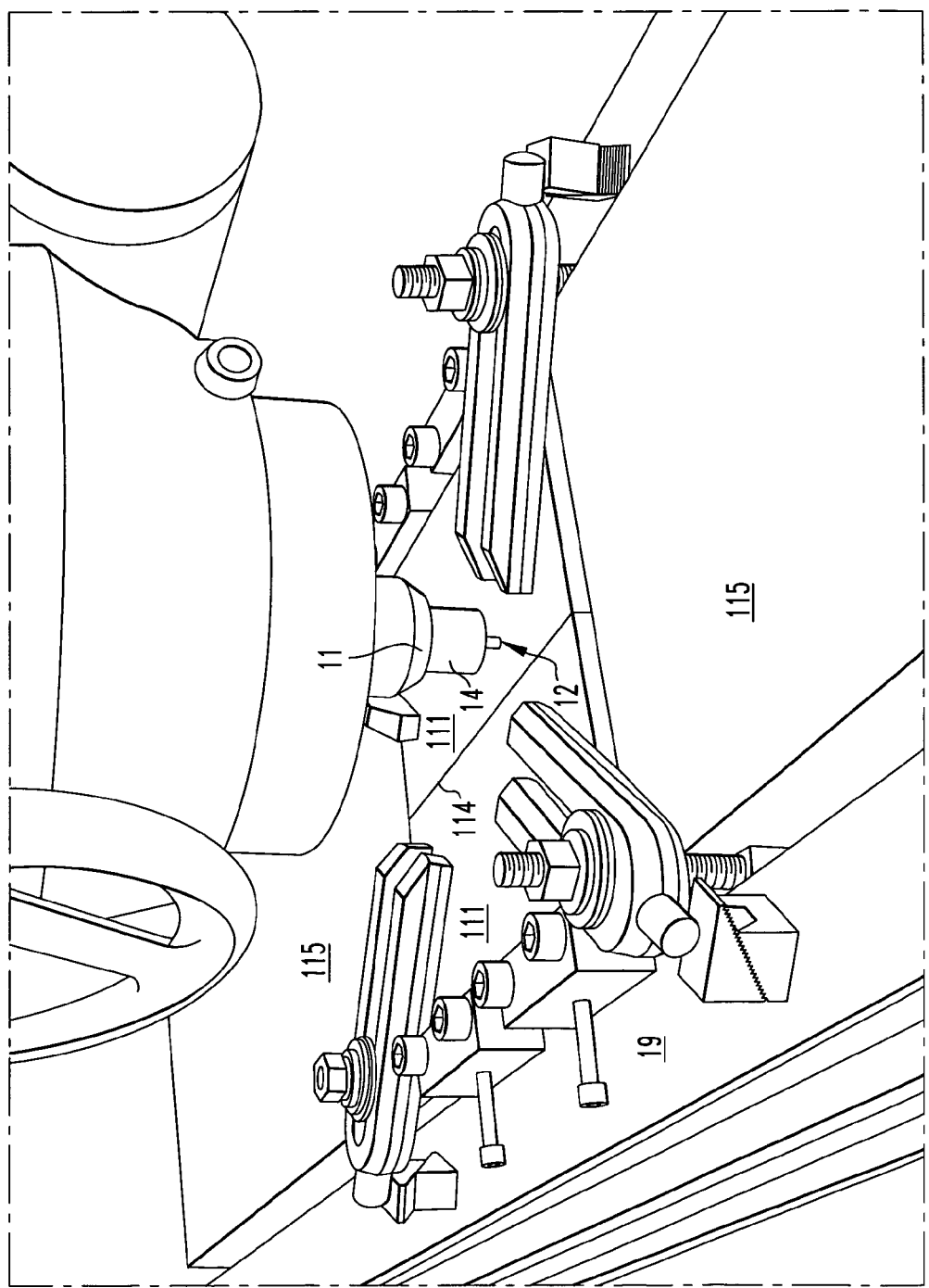
FIG. 2 is an illustration of a setup for friction stir welding.
Figure 3:
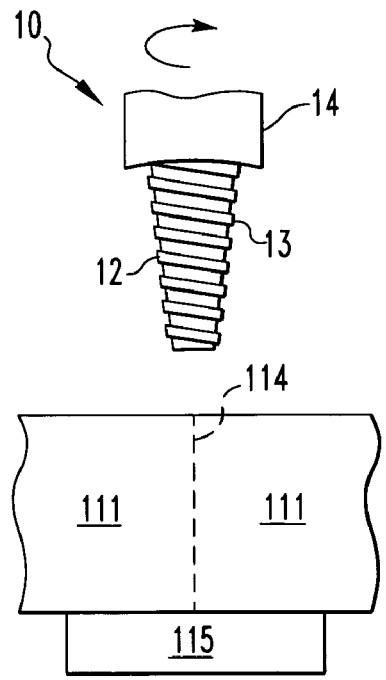
FIG. 3 is a schematic showing an FSW tool about to be plunged into a pair of workpieces to be butt welded together.
Figure 4:
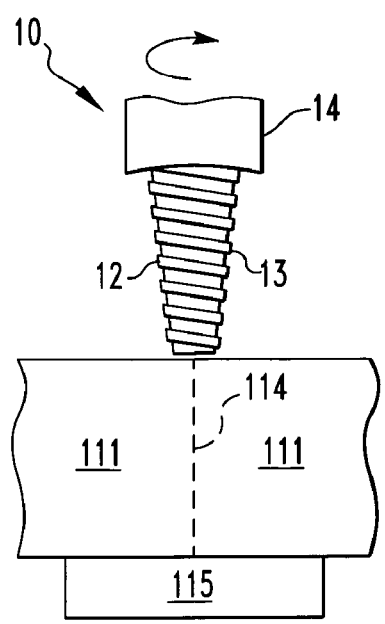
FIG. 4 is a schematic showing an FSW tool positioned adjacent to the workpieces being joined.
Figure 5:
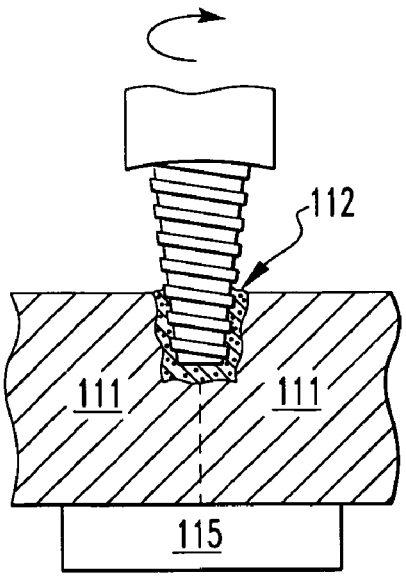
FIG. 5 is a schematic showing an FSW tool plunged a small depth into the workpieces.
Figure 6:
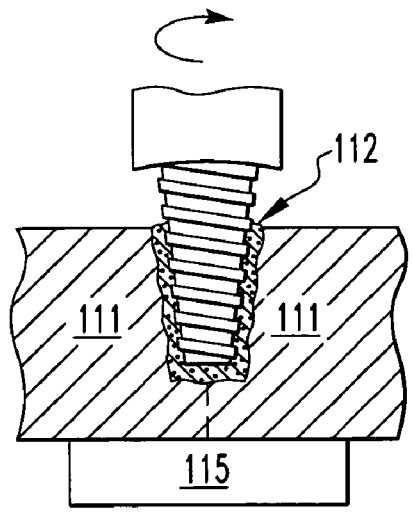
FIG. 6 is a schematic showing an FSW tool plunged further into the workpieces.
Figure 7:
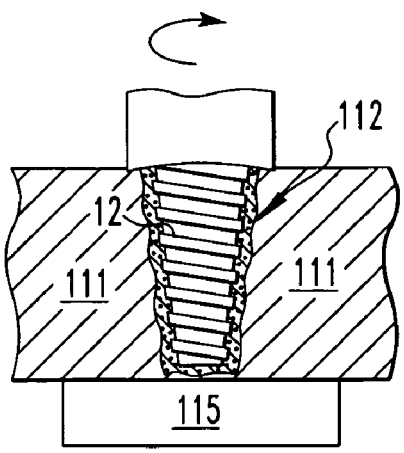
FIG. 7 is a schematic of an FSW tool plunged nearly full depth into the workpieces.
Figure 8:
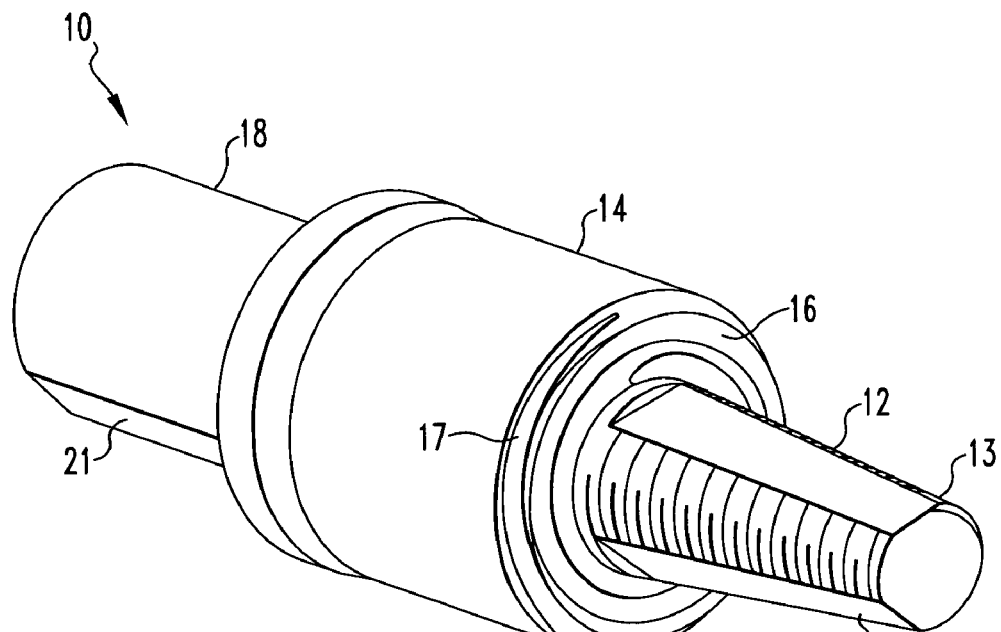
FIG. 8 is a more detailed illustration of an FSW tool.
Figure 9:
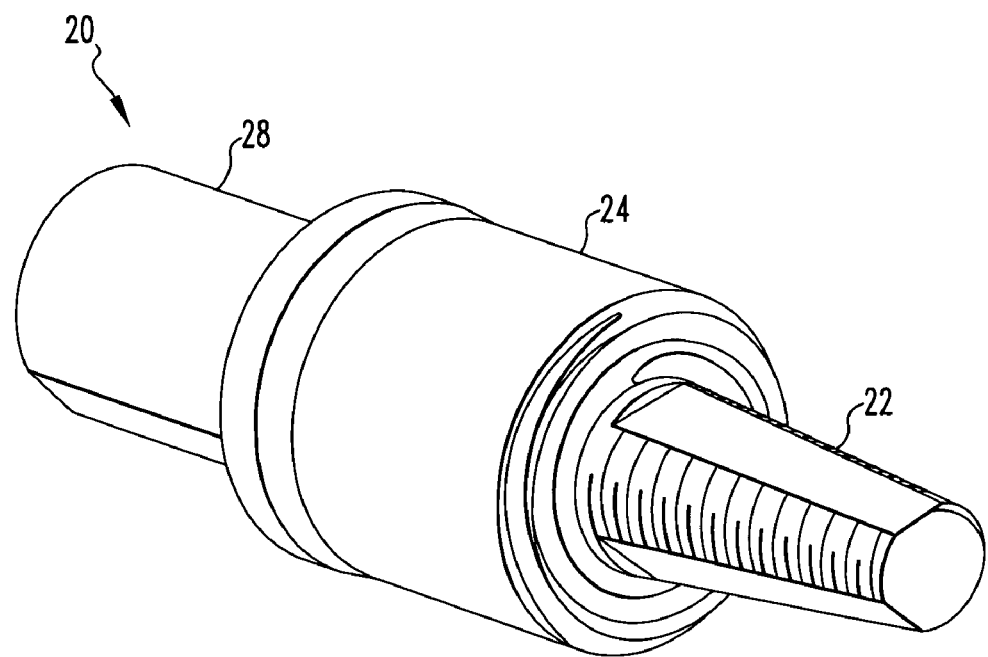
FIG. 9 is an illustration of an integrated (or monolithic) FSW tool.
Figure 10:
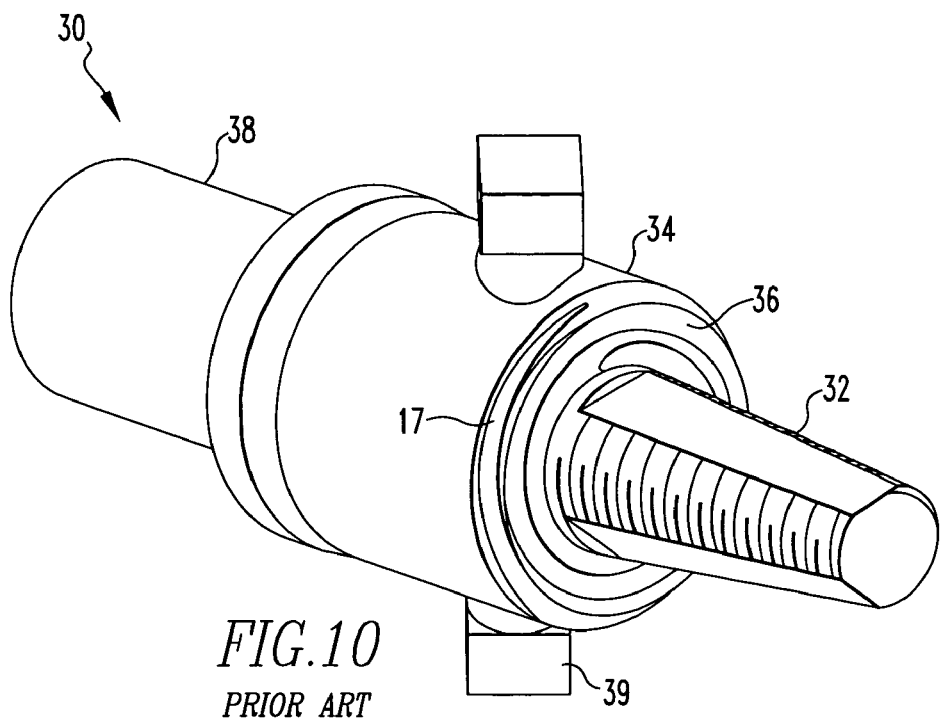
FIG. 10 is a sketch of a prior art FSW tool having a pin secured into a monolithic shoulder/shank by set screws.
Figure 11:
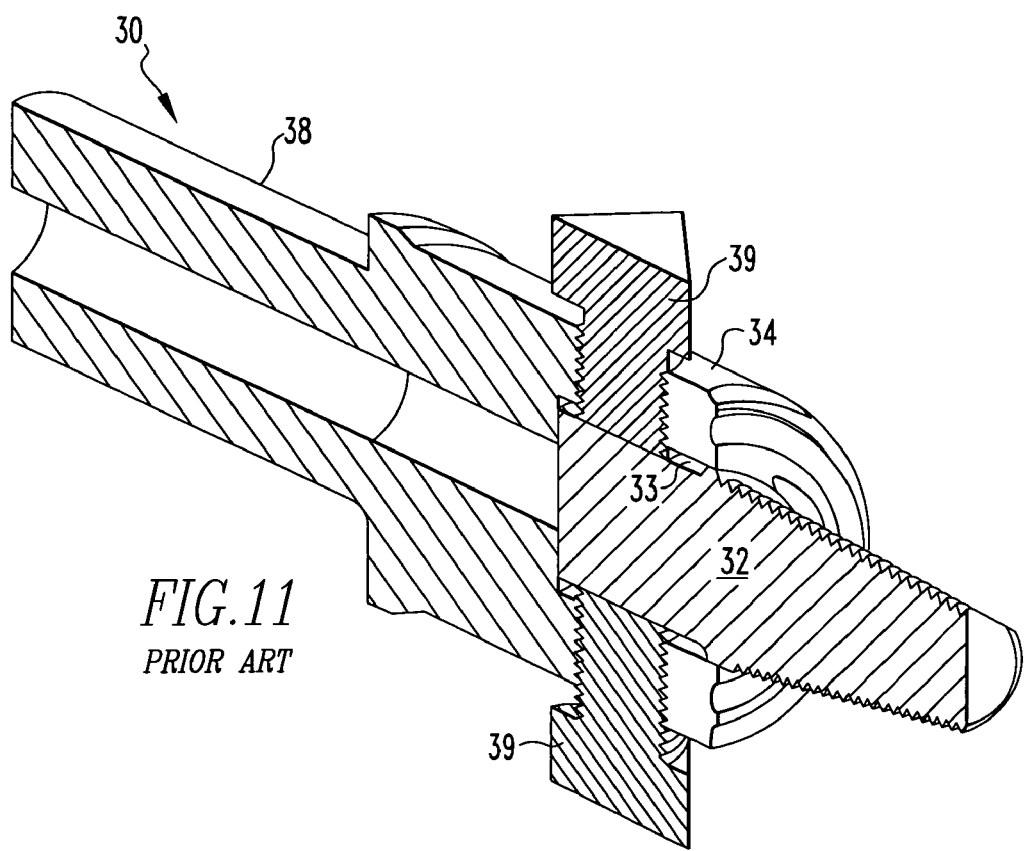
FIG. 11 is a sketch showing a median section of the prior art FSW tool shown in FIG. 10.
Figure 12:
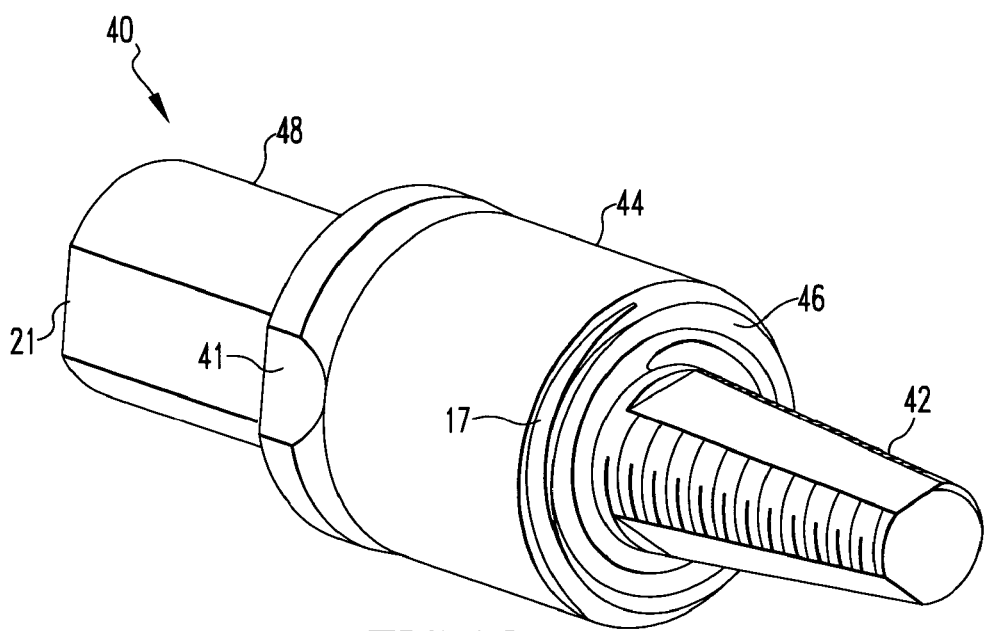
FIG. 12 is a sketch of an FSW tool, according to the present invention, which has an integral pin and shank with an attached shoulder.
Figure 13:
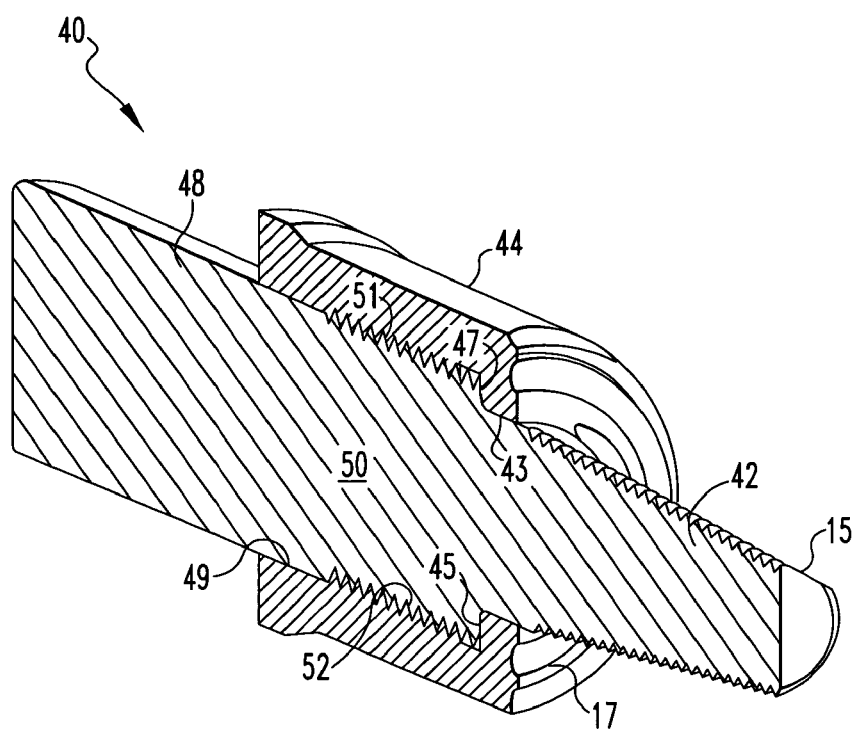
FIG. 13 is a sketch of a median section of the tool shown in FIG. 12.

FIGS. 12 and 13 are illustrations of an FSW tool 40 according to the present invention. The shank 48 and the pin 42 are integrally formed as a shank-pin unit 50, so the pin 42 is precisely concentric with the shank 48. This prevents eccentricity of the pin which would otherwise cause it to vibrate as it rotates in the workpiece.

An attachment feature connects the shoulder 44 to the shank-pin unit 50. Preferably, the attachment feature includes outside threads 51 on shank 48 and inside threads 52 on shoulder 44. Shoulder 44 is threaded onto the integrally formed shank-pin unit 50. The pitch of the threads 51 and 52 should be opposite to the threads on the working surface of the pin 42, so that friction between the workpiece(s) and the shoulder 44 tends to tighten shoulder 44 onto the integrally formed shank-pin unit 50 when FSW tool 40 is rotated in the direction which tends to move plasticized material from the proximal end of pin 42 toward the distal end of pin 42. Hence, the shoulder is self-locking onto the shank-pin unit. Preferably, shoulder 44 includes a spiral thread (or scroll) 17 which tends to cause plasticized material to move inwardly, toward the proximal end of pin 42 when FSW tool 40 is rotated in the direction which tends to move plasticized material from the proximal end of pin 42 toward the distal end of pin 42.

Preferably, there is a snug fit 49 between the OD of the shank 48 and the ID of the shoulder 44. There is also a snug fit 43 between the OD of the pin 42 and the ID of the shoulder 44, where it engages pin 42. Preferably, there is also a firm stop 45 on the shoulder 44, and a firm stop 47 on the shank-pin unit 50. The thread on the shank-pin and the threads 51 and 52 should be so configured that the shoulder can always be tightened until the firm stop 45 on the shoulder 44 engages the firm stop 47 on the shank-pin. It is also desirable to provide at least one flat 21 on shank 48 and at least one flat 41 on the shoulder 44, as sketched in FIG. 12, in order to torque the parts and make a firm assembly.

Preferably, the thermal expansion coefficient of the shoulder 44 should have a value close to that of the shank-pin unit. It may be slightly less than that of the shank-pin, so that heating of the tool during use increases the tightness of the snug fit 43 and the snug fit 49.

The arrangement shown in FIGS. 12 and 13 eliminates the set screws 39 of the prior art tool, and thus assures near perfect concentricity of the pin and shank. When the tool illustrated in FIGS. 12 and 13 is assembled, the shoulder 44 should be firmly tightened onto the shank-pin to ensure solid contact between the stop 45 on the shoulder 44 and the stop 47 on the shank-pin.

Another aspect of the present invention, which is complimentary with the concept for the integral shank-pin described above, addresses the cyclic bending moments on the pin as it rotates and translates through the workpiece(s).

Figure 14:
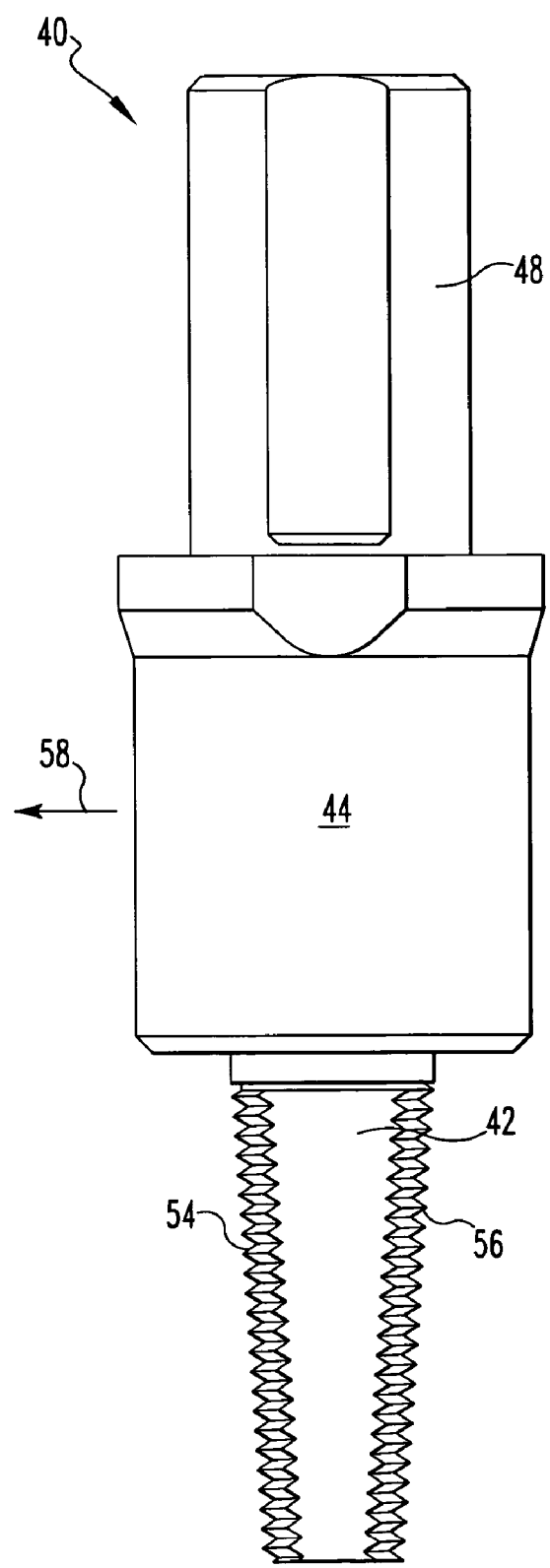
FIG. 14 is an illustration to elucidate the bending moments on the pin while it is moving along a joint.

FIG. 14 shows a friction stir welding tool 40 having pin 42. Pin 42 is moving through the workpiece(s) in direction 58. Friction with the workpiece(s) causes cantilever loadings on pin 42 which cause tension on side 54 and compression on side 56 of pin 42. Since pin 42 is rotating, these stresses are cyclic and tend to cause pin 42 to break.

As friction stir welded parts become stronger, harder and/or thicker, the FSW tools are subjected to more intense forces in the Z, X and Y directions, where Fz is the vertical forging force, Fx is the force in the direction of welding and Fy is the force in the direction transverse to the direction of welding. As the Fz and Fx forces increase on the tools, the pins of the tools experience more pronounced cantilever type loading, which in combination with the tools' rotation lead to tension/compression cyclic loading on the pins. When these loading conditions exceed the fatigue/tensile-stress endurance limit of the pins, the pins break.

The conventional approaches for dealing with the problem of pin breakage are:
a) Design of pins with large diameters, which reduces the cantilever induced stresses.
b) Use of stronger and tougher pin materials (e.g. MP159) that better withstand the rotary cyclic loading conditions.
c) Use of FSW parameters that increase the welding heat input and make the plasticized material softer and less resistant to the movement of the pin. The main drawback of operating with these parameters (slower speed of travel and higher RPM) is the lowering in the mechanical properties of the weldments and their heat affected zones due to the increased heat input, and also the reduction in productivity.

Unless there is a major breakthrough in using any or a combination of these three approaches, at the present time none of them can overcome the barrier to friction stir welding of some strong/hard materials and/or thick sections, with acceptable FSW tool life. The present invention advances a concept that will help to substantially overcome this barrier.

The concept is based on the realization that in order to overcome the present barrier of welding some strong/hard materials and/or thick sections, it is essential to substantially reduce and, if at all possible, to eliminate the effects of the tension stresses induced in the pin during friction stir welding (FIG. 14). To achieve this, this aspect of the present invention teaches the introduction of compressive stresses into the pin, which in turn will counteract the tension stresses in it. The concept will be implemented by introducing an internal tension member into the FSW tool, which will load the pin in compression.

Figure 15:
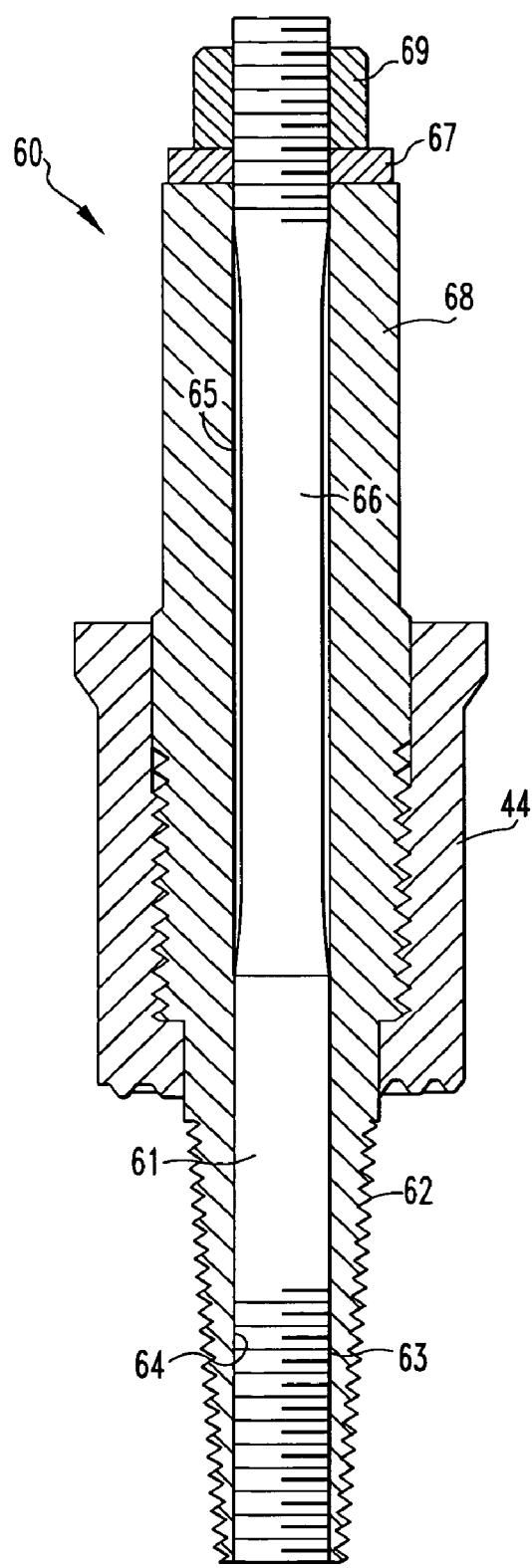
FIG. 15 is an illustration of a FSW tool, according to the present invention, which has an axial tension member to reduce cyclic bending moment induced tensile stresses in the pin portion of the tool.

One embodiment of this concept is illustrated in FIG. 15. A friction stir welding tool 60 has a pin 62 which is integral with shank 68. A shoulder 44 is threaded onto the integral shank-pin unit. An axial tension member 66 is provided, which internally engages pin 62 to place pin 62 in compression. The upper end of tension member 66 is tightened by nut 69, preferably a lock nut, which, preferably, compresses spring washer 67. Spring washer 67 is provided to accommodate creep of tension member 66, so that tension member 66 will continue to place pin 62 in compression even if tension member 66 undergoes some creep. If desired, a stack of spring washers may be employed in place of the single spring washer 67. A Belleville washer is an example of such a spring washer.

In this embodiment of the invention, engagement between pin 62 and tension member 66 is provided by internal threads 64 on pin 62, which engage external threads 63 on tension member 66. It is preferred that clearance 65 between tension member 66 and shank 68 be provided to facilitate assembly. It is also preferred that a close fit between tension member 66 and pin 62 be provided at location 61, which is at the proximal end of pin 62.

Figure 16:
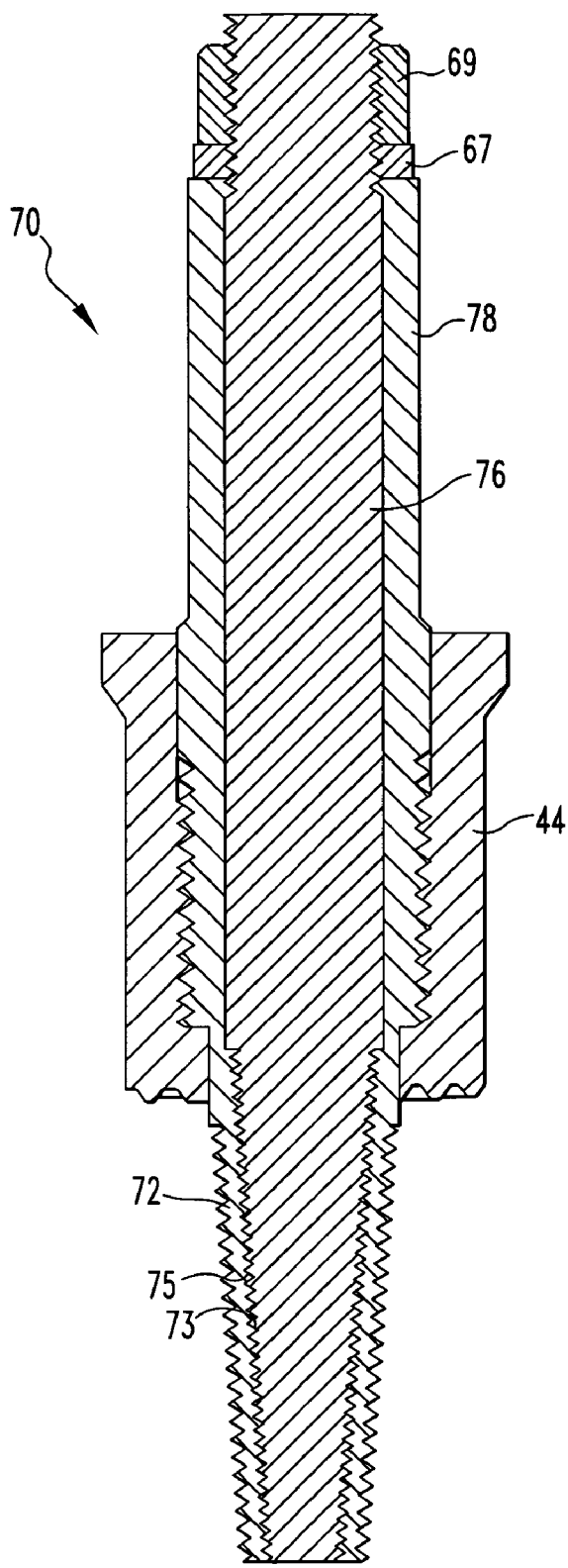
FIG. 16 is an illustration of a FSW tool, according to the present invention, having a tension member with tapered threads.

Another embodiment of this tension member concept is illustrated in FIG. 16. A friction stir welding tool 70 has a pin 72 integrally formed with a shank 78. A shoulder 44 is threaded onto the shank-pin unit. A tension member 76 places the pin 72 is compression. In this embodiment, the lower end of tension member 76 is tapered, and has tapered thread 75. Tapered thread 75 engages tapered inside thread 73 on the pin 72. This design makes possible a larger diameter tension member 76, which supplies more tension at the base of pin 72. As in the preceding embodiment, tension is supplied to tension member 76 through nut 69 acting through spring washer(s) 67.

Figure 17:
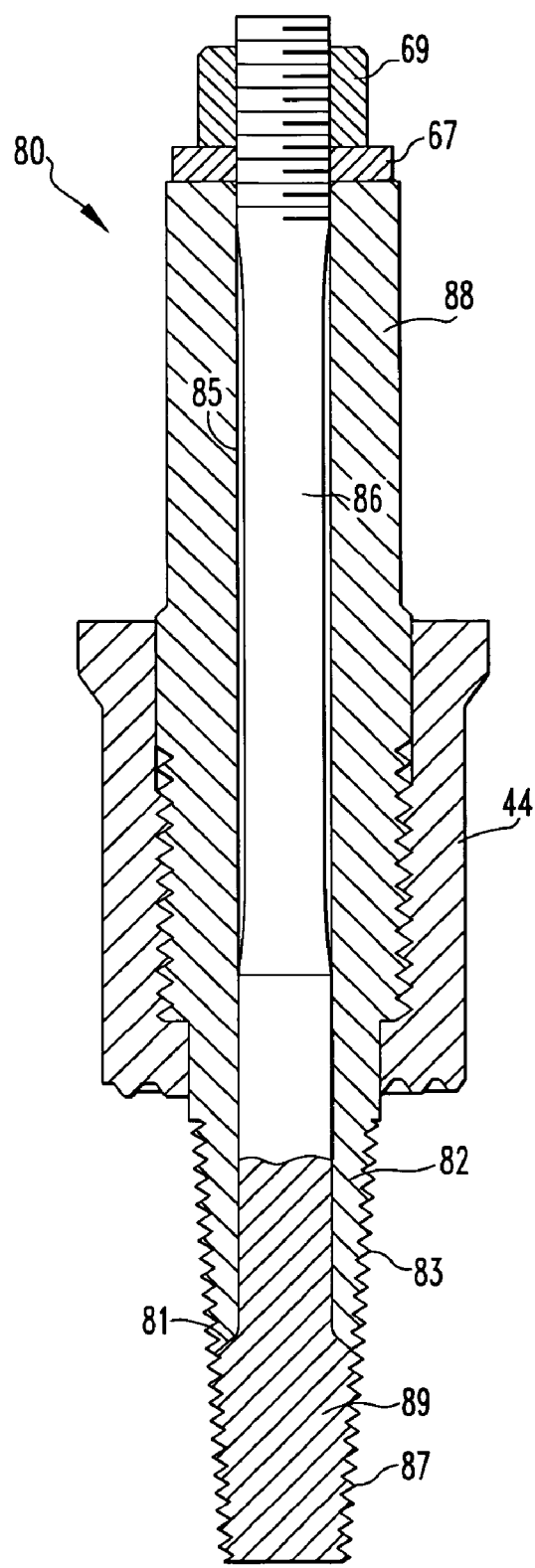
FIG. 17 is an illustration of a tool, according to the present invention, wherein a distal end of the tension member serves as a portion of the pin.

Another embodiment of this tension member concept is illustrated in FIG. 17. Friction stir welding tool 80 has a shank 88 which is integral with a shortened pin 82. A shoulder 44 is threaded onto the integral shank-pin unit. Friction stir welding tool 80 also has a tension member 86 having a distal portion 89 which engages the workpiece(s) as a friction stir welding tool. Tension member 86 has a shoulder 81 for placing shortened pin 82 in compression. This configuration has the virtue of providing maximum compression to the shortened pin 82. The distal portion 89 of the tension member 86 and the shortened pin 82 together act as a friction stir welding pin. Preferably, shortened pin 82 includes exterior threads 83 and distal portion 89 of tension member 86 includes exterior threads 87. The exterior threads 83 and exterior threads 87 serve to cause plasticized material to flow toward the distal end of distal portion 89 of tension member 86.

Figure 18:
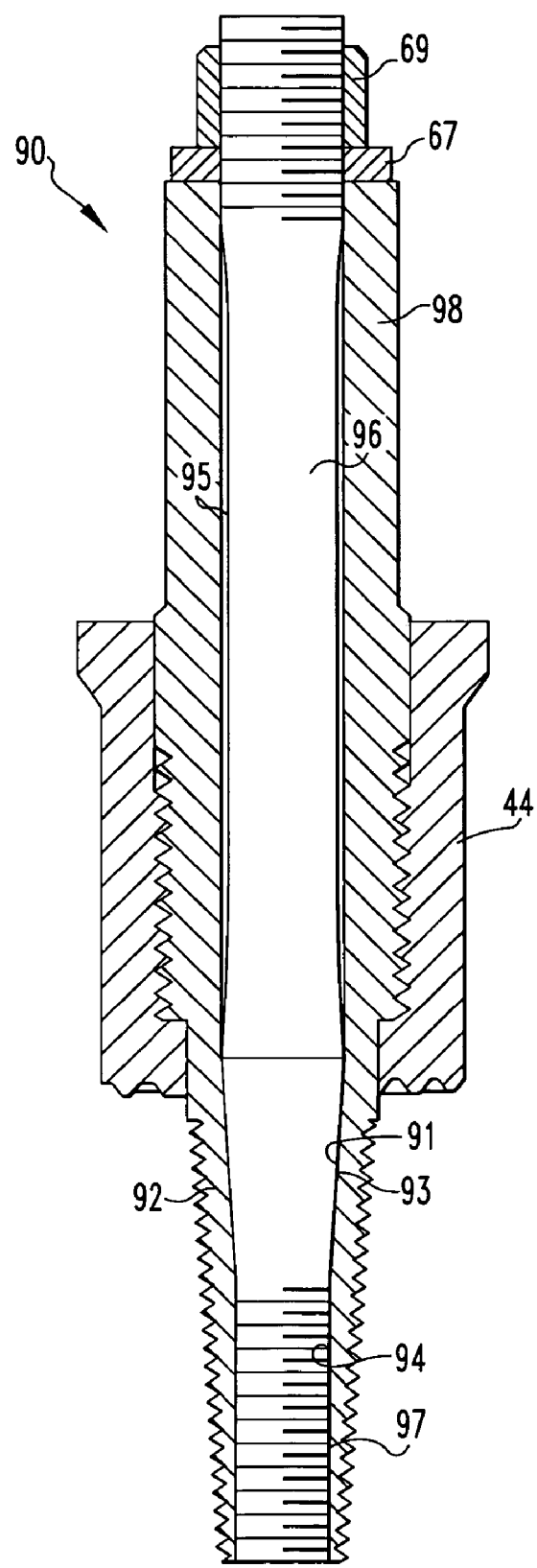
FIG. 18 is an illustration of a FSW tool, according to the present invention, having a tapered tension member which facilitates obtaining a close fit between the tension member and the proximal end of the pin.

Attention is now directed to FIG. 18 which illustrates a friction stir welding tool 90, which includes a shank 98 which is integral with pin 92. Shoulder 44 is threaded onto the integral shank-pin unit. Tension member 96 has outside threads 97 which engage inside threads 94 of pin 92. Tension is supplied to tension member 96 by nut 69 acting through spring washer(s) 67. Tension member 96 has a tapered outer portion 93 which engages tapered inside portion 91 of pin 92 to provide a snug fit between tension member 96 and pin 92 at the proximal end of pin 92.

Figure 19:
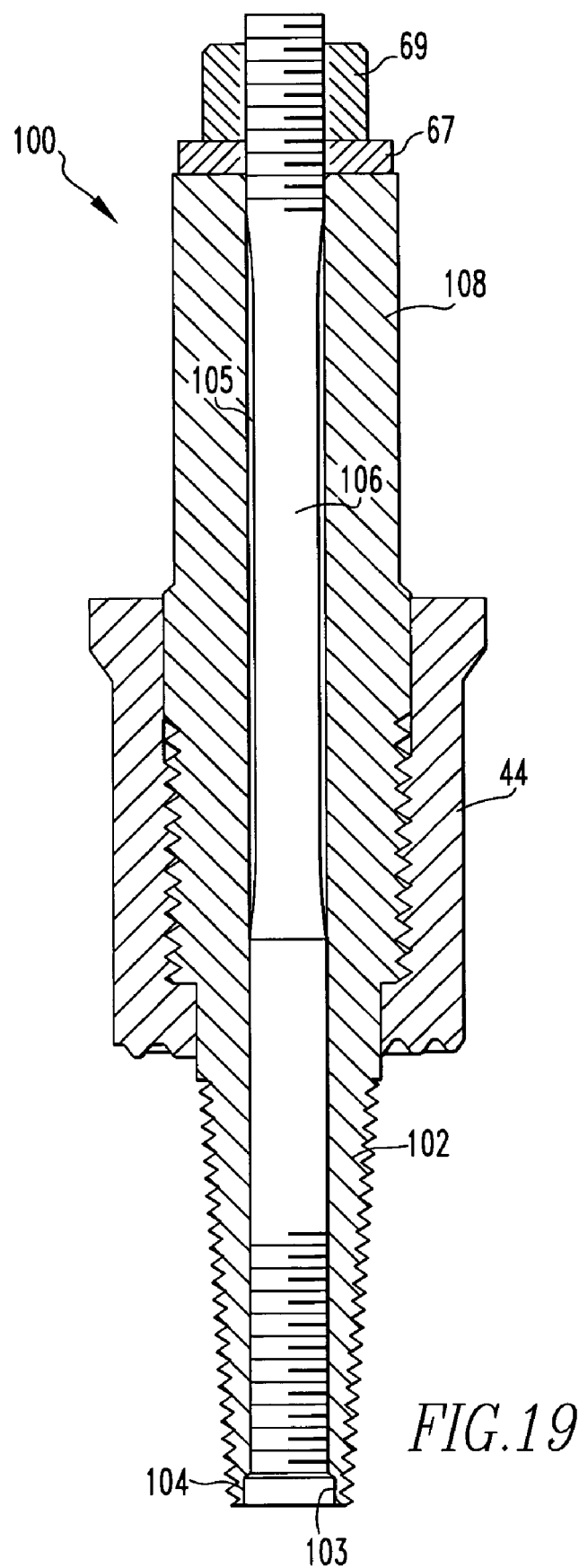
FIG. 19 is an illustration of a FSW tool having a tension member including a tension member shoulder at its distal end.

Another embodiment of the present invention is illustrated in FIG. 19. Friction stir welding tool 100 includes a shank 108 which is integral with pin 102. Shoulder 44 is threaded onto the integral shank-pin unit. A tension member 106 includes a tension member shoulder 104 which is received into recess 103 in the distal end of pin 102. Tension is supplied to tension member 106 by nut 69 acting through spring washer(s) 67.

Figure 20:
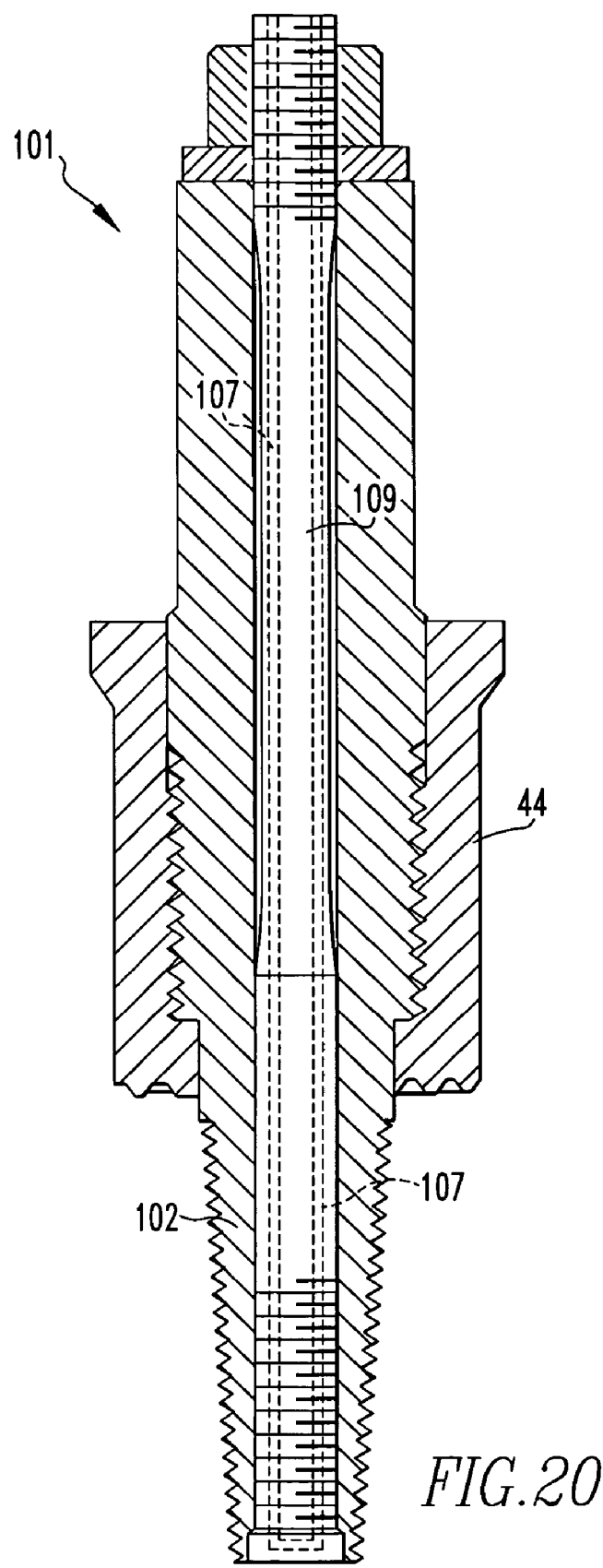
FIG. 20 is an illustration of a FSW tool similar to the tool illustrated in FIG. 19 wherein the tension member includes a cooling duct.

FIG. 20 illustrates a friction stir welding tool 101 which is similar to tool 100 shown in FIG. 19. Friction stir welding tool 101 includes a tension member 109 having a cooling duct 107. Cooling duct 107 is for cooling tension member 109, pin 102 and shoulder 44. The cooling fluid, preferably would be air. It would be supplied by a commutation means (not shown) at the upper end of tension member 109.

Figure 21:
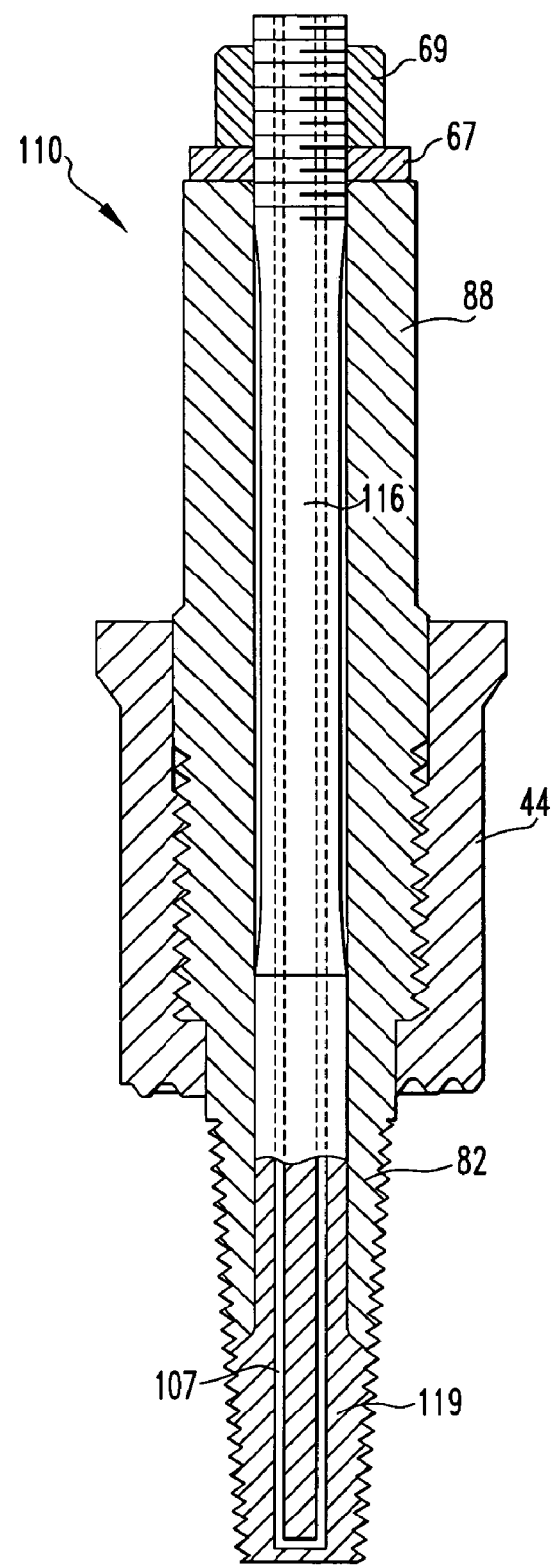
FIG. 21 is an illustration of an FSW tool which is similar to the FSW tool shown in FIG. 17, but further including a cooling duct in the tension member.

FIG. 21 illustrates a friction stir welding tool 110 in accordance with the present invention. Friction stir welding tool 110 includes a shank 88 which is integral with shortened pin portion 82. Shoulder 44 is threaded onto the integral shank-pin unit. Tension is supplied by tension member 116 having a portion 119 acting as a pin. Tension member 116 includes cooling duct 107.

Figure 22:
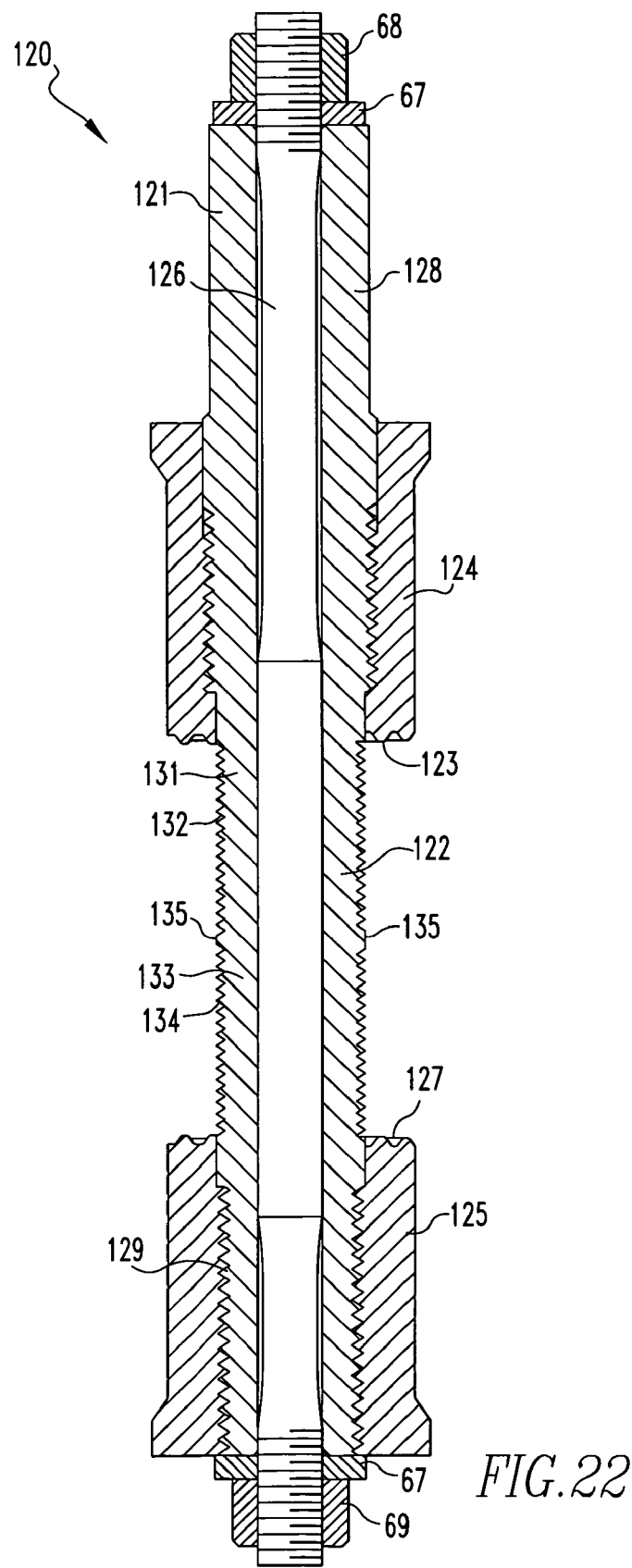
FIG. 22 is an illustration of a bobbin type FSW tool which does not require an anvil, and which has an axial tension member.

Attention is now directed to FIG. 22, which illustrates a bobbin type friction stir welding tool 120 including a tension member 126, according to the present invention. Bobbin type friction stir welding tool 120 is intended for welding workpiece(s) in which it is not possible to place an anvil such as anvil 115 shown in FIGS. 3-7 on the side of the workpiece(s) opposite the side on which the chuck or collet 11 is disposed.

Bobbin type tool 120 includes a shank-pin unit 121 including a distal portion 129 and a shank portion 128, both of which are integral with a pin portion 122. Shank portion 128 is for engagement with a chuck or collet of a friction stir welding machine. A proximal shoulder 124 is threaded onto the shank portion 128 at a proximal location as shown in FIG. 21, and a distal shoulder 125 is threaded onto the distal portion 129 of the shank-pin unit 121 as also shown. The pin portion 122 of shank-pin unit 121 is placed in compression by axial tension member 126. Tension may be applied to tension member 126 by either nut 69 acting through the corresponding spring washer 67.

Bobbin type tool 120 is preferred over prior art bobbin type friction stir welding tools because compression of the pin 122 in tool 120 makes it possible to weld thicker workpieces than is possible with prior art bobbin type friction stir welding tools.

Bobbin type tool 120 is for pressing laterally against a pair of plates to be butt welded. In a typical application, pin 122 would traverse along the joint between the plates. Proximal shoulder 124 would typically engage the top surface of the plates to prevent upward escape of plasticized material and effect a smooth top surface on the resulting weldment. Likewise, distal shoulder 125 would, in that case, engage the bottom surface of the plates to prevent downward escape of plasticized material and effect a smooth bottom surface for the weldment. Proximal shoulder 124 has a working face 123 and distal shoulder 125 has a working face 127. Working face 123 and working face 127, preferably, have spiral threads such that rotation of FSW tool 120 in a predetermined direction tends to cause plasticized material adjacent working faces 123 and 127 to move inwardly, toward pin 122. The spiral threads on working faces 123 and 127 are similar to the spiral thread 17 illustrated in FIG. 13.

Preferably, pin 122 has a proximal portion 131 having a thread 132, and a distal portion 133 having thread 134. Preferably, threads 132 and 134 have opposite pitch and are such that when FSW tool 120 is rotated in the predetermined direction cited above, threads 132 and 134 tend to cause plasticized material to move away from the corresponding shoulders 124 and 125, toward the midpoint 135 of pin 122.

Friction stir welding tools to which the present invention invention may be applied may be made of MP159, H13, Margin C-350, Tungsten, Ceramic, etc. The concepts of this invention can also be used with any type of shoulder design e.g. smooth, scrolls with concentric rings, or spiraled ridges, etc.

The invention provides the advantages of being able to weld stronger/harder materials, and/or thicker sections. With the present invention, FSW becomes more cost effective, attained by use of more durable FSW tools. Another benefit is the possibility of welding faster and hence more productively. Welding faster also reduces the heat input per unit length of weld and thus improves the metallurgical quality of the welds.

The presently preferred and alternative embodiments of the present invention having been described herein, it is to be understood that the invention may be otherwise embodied within the scope of the appended claims.

We claim:

1. A friction stir welding tool comprising:
   an integral shank-pin unit having an axial bore therethrough, a pin portion for plunging into at least one workpiece to perform a friction stir welding operation on the at least one workpiece, a shank portion for engagement with a chuck or collet of a friction stir welding tool, wherein the pin portion includes a tip, a base, and a tension member engagement feature in proximity of the tip, wherein the base being juxtaposition the shank portion;
   a shoulder removably connected to the integral shank-pin unit for preventing plasticized material from flowing out of the workpiece(s); and
   a tension member having a distal end with an engagement feature complimentary to the tension member engagement feature of the pin portion and a proximal end with an engagement feature, wherein the proximal end extends out of the axial bore of the integral shank-pin unit when the tension member is disposed within the axial bore of the integral shank-pin unit and the distal end engagement feature of the tension member is engaged with the tension member engagement feature of the pin portion; and
   an adjustable tension member engagement device to adjustably engage the proximal end of the tension member to simultaneously impose a predetermined inward axial force upon the tension member engagement feature of the pin portion and the shank portion of the integral shank-pin unit, thereby placing the pin portion in substantial compression between the tip and the base, whereby cyclic tensile stresses during friction stir welding are reduced.

2. A friction stir welding tool, according to claim 1, wherein the shank portion includes an exterior threaded portion on an exterior surface thereof and the shoulder includes an interior threaded portion on an interior surface thereof,
   wherein the pin portion includes an exterior threaded portion for causing plasticized material to flow from a proximal end of the pin toward a distal end of the pin when the friction stir welding tool is rotated in a predetermined direction, and
   wherein the exterior threaded portion of the shank portion and the interior threaded portion of the shoulder have a pitch opposite to a pitch of an exterior threaded portion of the pin portion so that when the friction stir welding tool is rotated in the predetermined direction, friction between the shoulder and the workpiece(s) tends to tighten the shoulder more firmly onto the integral shank-pin unit.

3. A friction stir welding tool, according to claim 1, wherein the shank-pin unit has a first firm stop on an exterior surface thereof, the first firm stop for engaging a second firm stop on an interior surface of the shoulder whereby the friction stir welding tool may be firmly assembled.

4. A friction stir welding tool, according to claim 2, wherein a proximal end of the pin portion of the shank-pin unit has a snug fit with a distal end of the shoulder whereby the shank-pin unit may be precisely centered in the shoulder, and the shank portion of the shank-pin unit has a snug fit with a proximal end of the shoulder whereby the shoulder and the shank-pin unit may be precisely aligned.

5. A friction stir welding tool, according to claim 2, wherein a working face of the shoulder includes a spiral thread whereby rotation of the tool in the predetermined direction tends to cause plasticized material to flow inwardly, toward the proximal end of the pin.

6. A friction stir welding tool, according to claim 2, wherein the shoulder of the tool includes at least one flat, the at least one flat being for facilitating assembly of the shoulder to the shank-pin assembly.

7. A friction stir welding tool, according to claim 2, wherein the shank of the shank-pin unit includes at least one flat, the at least one flat being for facilitating assembly of the shoulder to the shank-pin assembly, and/or for mounting in a chuck or collet of a friction stir welding tool.

8. A friction stir welding tool, according to claim 1, wherein the distal end engagement feature of the tension member are external threads and tension member engagement feature of the integral shank-pin are internal threads.

9. A friction stir welding tool, according to claim 1, wherein the tension member proximal end includes exterior threads thereon, the exterior threads are capable of engagement with the adjustable tension member engagement device, wherein the adjustable tension member engagement device is a nut for placing the tension member in tension.

10. A friction stir welding tool, according to claim 9, further including at least one spring washer under the nut, the at least one spring washer being for accommodating thermal expansion and/or creep in said tension member.

11. A friction stir welding tool, according to claim 1, further includes a clearance between the tension member and the shank portion of the friction stir welding tool to facilitate assembly.

12. A friction stir welding tool, according to claim 8, wherein the external threads on the distal end of the tension member and the internal threads on the distal end of the pin are tapered.

13. A friction stir welding tool, according to claim 1, wherein the tension member further includes a distal end pin extension capable of plasticizing material.

14. A friction stir welding tool, according to claim 13, wherein the distal end pin extension of said tension member has exterior threads for friction stir welding.

15. A friction stir welding tool, according to claim 13, wherein the distal end engagement feature of the tension member is a shoulder thereon and the tension member engagement feature of the pin is a shoulder having a geometry complimentary to that of the shoulder of the tension member, whereby the engagement of the shoulders is capable of placing the pin portion in substantial compression between the tip and the base.

16. A friction stir welding tool, according to claim 1, wherein the distal end engagement feature of the tension member is a shoulder thereon and the tension member engagement feature of the pin is a recess having a geometry complimentary to that of the shoulder of the tension member, whereby the engagement of the shoulders is capable of receiving the shoulder of the tension member to define a contact interface for placing the pin portion in substantial compression between the tip and the base.

17. A friction stir welding tool, according to claim 1, wherein the tension member defines at least one cooling duct for cooling said pin.

18. A bobbin type friction stir welding tool comprising:
an integral shank-pin unit having a proximal end, a distal end and a axial bore therethrough, said integral shank-pin unit comprising:
a proximal shank portion;
a distal shank portion;
a pin portion disposed between the proximal shank portion and the distal shank portion;
a proximal shoulder attached to said proximal shank portion, said proximal shoulder having a working face adjacent said pin portion;
a distal shoulder attached to said distal shank portion, said distal shoulder having a working face adjacent said pin portion;
a tension member having two ends, wherein the two ends extend beyond the proximal end and the distal end of the integral shank-pin unit when the tension member is disposed within the axial bore of the integral shank-pin unit; and
a pair of tension member end attachment devices, wherein at least one of the pair of tension member end attachment devices is adjustably engageble to the distal end or the proximal end of the tension member to impose an inward axial force upon the distal end and the proximal end of the integral shank-pin unit, thereby placing the pin portion in compression,
whereby the bobbin type friction stir welding tool is capable of welding workpiece(s) having top surface(s) and bottom surface(s), the pin portion for moving along a joint to be friction stir welded, the proximal shoulder for preventing plasticized material from escaping upwardly, and the distal shoulder for preventing the plasticized material from escaping downwardly; and the tension member reducing cyclic tension stresses in the pin portion.

19. A bobbin type friction stir welding tool, according to claim 18, wherein the pin portion comprises a proximal pin portion and a distal pin portion, the proximal pin portion includes threads being opposite to threads on the distal pin portion, whereby rotation of the bobbin type friction stir welding tool tends to cause plasticized material adjacent the pin portion to move toward a midpoint of the pin portion when the bobbin type friction stir welding tool is rotated in a predetermined direction.

20. A bobbin type friction stir welding tool, according to claim 19, wherein the working face of the proximal shoulder has a spiral thread tending to move plasticized material toward the proximal pin portion, and wherein the working face of the distal shoulder has a spiral thread tending to move plasticized material toward the distal pin portion when the bobbin type friction stir welding tool is rotated in the predetermined direction.

21. A bobbin type friction stir welding tool, according to claim 18, wherein the adjustably engageble tension member attachment device is a nut.

22. A bobbin type friction stir welding tool, according to claim 21, further comprising a spring washer compressed by the nut, wherein the spring washer is capable of compensating for creep and/or thermal expansion of the tension member.

* * * * *

UNITED STATES PATENT AND TRADEMARK OFFICE
CERTIFICATE OF CORRECTION

PATENT NO. : 7,401,723 B2 Page 1 of 1
APPLICATION NO. : 11/100878
DATED : July 22, 2008
INVENTOR(S) : Israel Stol and John W. Cobes It is certified that error appears in the above-identified patent and that said Letters Patent is hereby corrected as shown below:

In column 9, line 23, line 2 of claim 9, after "end", insert --engagement feature--.

Signed and Sealed this

Twenty-third Day of September, 2008

JON W. DUDAS
*Director of the United States Patent and Trademark Office*